United States Patent
Chen et al.

(10) Patent No.: US 12,327,359 B2
(45) Date of Patent: Jun. 10, 2025

(54) IMAGE SEGMENTATION AND TRACKING BASED ON STATISTICAL SHAPE MODEL

(71) Applicant: Shanghai United Imaging Intelligence Co., Ltd., Shanghai (CN)

(72) Inventors: Xiao Chen, Cambridge, MA (US); Xiaoling Hu, Setauket-East Setauket, NY (US); Zhang Chen, Brookline, MA (US); Yikang Liu, Cambridge, MA (US); Terrence Chen, Lexington, MA (US); Shanhui Sun, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 368 days.

(21) Appl. No.: 17/538,282

(22) Filed: Nov. 30, 2021

(65) Prior Publication Data

US 2023/0169659 A1  Jun. 1, 2023

(51) Int. Cl.
| | |
|---|---|
| *G06T 7/11* | (2017.01) |
| *G06T 3/18* | (2024.01) |
| *G06T 7/149* | (2017.01) |
| *G06T 7/246* | (2017.01) |

(52) U.S. Cl.
CPC .............. *G06T 7/11* (2017.01); *G06T 3/18* (2024.01); *G06T 7/149* (2017.01); *G06T 7/246* (2017.01); *G06T 2207/10088* (2013.01); *G06T 2207/20081* (2013.01); *G06T 2207/20084* (2013.01); *G06T 2207/20124* (2013.01); *G06T 2207/30048* (2013.01)

(58) Field of Classification Search
CPC . G06T 7/11; G06T 7/149; G06T 2207/20081; G06T 2207/20084; G06T 2207/20124; G06T 2207/30048; G06V 10/82
See application file for complete search history.

(56) References Cited

U.S. PATENT DOCUMENTS

| | | | |
|---|---|---|---|
| 9,501,829 B2 * | 11/2016 | Carlton | G16H 20/40 |
| 10,032,281 B1 * | 7/2018 | Ghesu | G16H 50/70 |
| 2003/0069494 A1 | 4/2003 | Jolly | |
| 2009/0136103 A1 | 5/2009 | Sonka et al. | |
| 2010/0061601 A1 * | 3/2010 | Abramoff | G06T 7/33 |
| | | | 382/117 |
| 2015/0243026 A1 * | 8/2015 | Dwivedi | G06T 7/11 |
| | | | 382/128 |

(Continued)

OTHER PUBLICATIONS

Dong et al. "Deep atlas network for efficient 3D left ventricle segmentation on echocardiography." Medical image analysis 61 (2020): 101638. (Year: 2020).*

Primary Examiner — Katrina R Fujita
(74) Attorney, Agent, or Firm — Zhong Law, LLC

(57) ABSTRACT

Described herein are systems, methods, and instrumentalities associated with segmenting and/or determining the shape of an anatomical structure. An artificial neural network (ANN) is used to perform these tasks based on a statistical shape model of the anatomical structure. The ANN is trained by evaluating and backpropagating multiple losses associated with shape estimation and segmentation mask generation. The model obtained using these techniques may be used for different clinical purposes including, for example, motion estimation and motion tracking.

18 Claims, 8 Drawing Sheets

(56) References Cited

U.S. PATENT DOCUMENTS

| | | | |
|---|---|---|---|
| 2016/0174902 A1* | 6/2016 | Georgescu | G06V 10/454 |
| | | | 600/408 |
| 2016/0364880 A1* | 12/2016 | Barratt | G06T 7/149 |
| 2017/0109881 A1* | 4/2017 | Avendi | G06V 10/764 |
| 2017/0337682 A1* | 11/2017 | Liao | A61B 5/7267 |
| 2018/0260957 A1* | 9/2018 | Yang | G06T 7/143 |
| 2020/0090350 A1* | 3/2020 | Cho | G16H 30/40 |
| 2021/0125331 A1* | 4/2021 | Sun | G06T 7/11 |
| 2024/0202914 A1* | 6/2024 | Dawant | G06T 3/18 |

\* cited by examiner

IMAGE SEGMENTATION AND TRACKING BASED ON STATISTICAL SHAPE MODEL

BACKGROUND

Segmentation is an important medical image analysis technique. By identifying pixels of an anatomical structure such as the human heart from a background medical image, the technique may provide critical knowledge about the shape and/or volume of the anatomical structure, which may then be used for multiple clinical purposes including, e.g., volume analysis, strain analysis, motion estimation, and/or motion tracking. Assisted by newly developed machine learning methods and deeper and faster artificial neural networks, prior art segmentation techniques have been greatly improved with respect to speed and accuracy. Many challenges remain, however, due to similarities in anatomical structures, image artifacts, etc., which often lead to undesirable defects such as broken connections, wrong anatomy, inconsistent results, etc. When applied in motion tracking applications such as those relying on tracking features across multiple image frames, the shortcomings of the existing segmentation techniques may be exacerbated because as the frames move away from an initial position, errors associated with the feature prediction may accumulate and eventually impact the integrity of the outcome produced. Direct estimation of point correspondence between different image frames can also be a very challenging task, given the lack of local image features.

Accordingly, systems, methods, instrumentalities for improving the quality of medical image segmentation and/or motion tracking are highly desirable.

SUMMARY

Described herein are systems, methods, and instrumentalities associated with organ shape tracking and image segmentation. An apparatus configured to perform these tasks may comprise one or more processors configured to receive a representation of an anatomical structure and a medical scan image of the anatomical structure. The representation may include a point cloud indicating a statistical shape of the anatomical structure. Such a shape may be, for example, a mean shape of the anatomical structure determined based on a predetermined statistical shape model for the anatomical structure. The one or more processors of the apparatus may be configured to implement an artificial neural network (ANN) and may use the ANN to determine, based on the received medical scan image, a first plurality of parameters for adjusting the shape of the anatomical structure indicated by the received representation and a second plurality of parameters for transforming the received representation. Using the first plurality of parameters and the second plurality of parameters, the one or more processors of the apparatus may be further configured to generate a refined representation of the anatomical structure using the ANN and segment (e.g., by way of a segmentation mask) the anatomical structure in the medical scan image based on the refined representation of the anatomical structure.

In examples, the ANN described herein may comprise one or more rendering layers configured to generate the segmentation mask based on the refined representation of the anatomical structure in a differentiable manner. This way, a loss may be determined based on the segmentation mask during training of the ANN and used to refine the parameters of the ANN. In examples, the ANN described herein may comprise one or more shape adjustment layers configured to adjust the shape of the anatomical structure using the first plurality of parameters to obtain a warped representation of the anatomical structure, and the ANN may further comprise one or more transformation layers configured to apply an affine transformation to the warped representation of the anatomical structure using the second plurality of parameters.

In examples, the ANN described herein may be trained through a process that comprises receiving a training image of the anatomical structure, receiving a training representation (e.g., such as a point cloud) of the anatomical structure that indicates a mean shape of the anatomical structure, estimating values of the first plurality of parameters (e.g., deformation parameters) and the second plurality of parameters (e.g., affine parameters), adjusting the training representation of the anatomical structure using the estimated values of the first plurality of parameters and the second plurality of parameters, predicting a segmentation of the anatomical structure based on the adjusted training representation of the anatomical structure, and adjusting parameters of the ANN based on losses (e.g., differences) between the various prediction/estimation results and their associated ground truths. For example, the parameters of the ANN may be adjusted based on the predicted segmentation of the anatomical structure and a ground truth segmentation of the anatomical structure. The parameters of the ANN may also be adjusted based on a difference between the adjusted training representation and a ground truth representation of the anatomical structure. The parameters of the ANN may also be adjusted based on a difference between the first plurality of parameters and a ground truth for the first plurality of parameters, and/or a difference between the second plurality of parameters and a ground truth for the second plurality of parameters.

The parameters, point clouds, and/or segmentation masks determined using the techniques described herein may be used to serve multiple clinical purposes. Using the first and second pluralities of the parameters described above, the one or more processors of the apparatus may be further configured to determine the shape of the anatomical structure over a time period (e.g., a cardiac cycle) and thereby track the motion of the anatomical structure during the time period.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings.

Figure 1:
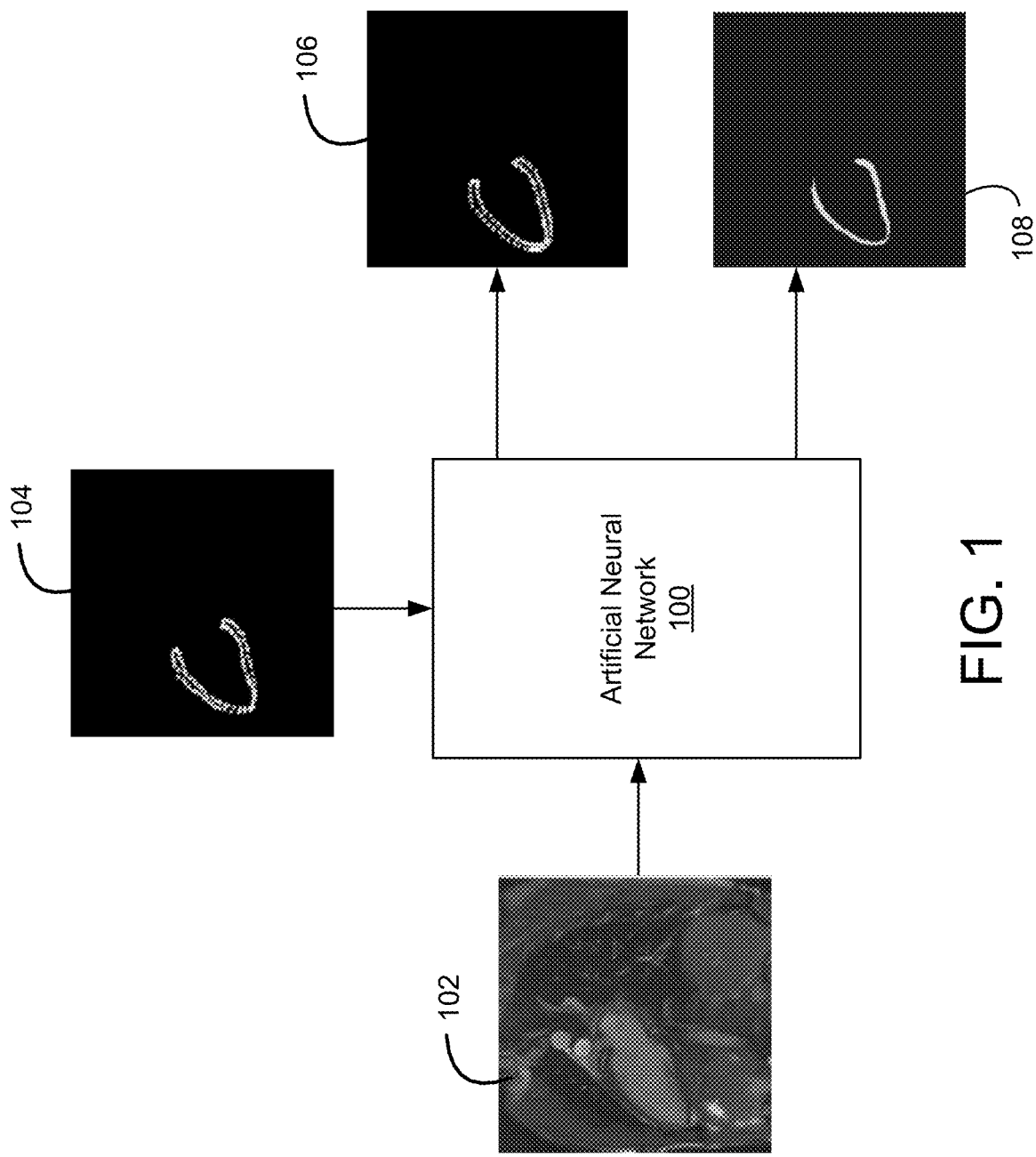
FIG. 1 is a simplified diagram illustrating an example neural network in accordance with one or more embodiments describe herein.

FIG. 1 is a simplified diagram illustrating an example neural network 100 in accordance with one or more embodiments describe herein. As shown, neural network 100 may be configured to receive a medical scan image 102 and a representation 104 of the anatomical structure, and generate at least one of a refined representation 106 of the anatomical structure or a segmentation mask 108 for the anatomical structure. The anatomical structure described herein may include an organ or a tissue of the human body such as, e.g., the myocardium, the left ventricle epicardium, the left ventricle endocardium, the right ventricle epicardium, the right ventricle endocardium, and/or the like. The medical scan image 102 of such an anatomical structure may be captured using various imaging modalities including magnetic resonance imaging (MRI), computer tomography (CT), X-Ray imaging, ultrasound, etc. The medical scan image 102 may include a single (e.g., static) scan image such as a single MRI scan image, or a series of scan images (e.g., dynamic scan images) such as those included in an MRI cine movie. In the latter case, the series of scan images may be processed by the neural network 100 on an individual basis (e.g., as multiple static images), for example, in accordance with the sequential order of the images in the cine movie.

Representation 104 of the anatomical structure may include a point cloud (e.g., a set of data points in space) that may indicate a shape of the anatomical structure. Representation 104 may also be provided in other forms including, for example, a three-dimensional (3D) mesh of the anatomical structure. In any event, representation 104 may be derived from a cohort or population and may represent a mean shape (e.g., an average shape) of the anatomical structure among the cohort or population. Techniques for deriving such a mean shape will be described in greater detail below. Since the mean shape may only represent a baseline shape (e.g., a mean or average shape) of the anatomical structure, it may not accurately reflect the actual shape of the anatomical structure depicted by medical scan image 102. The neural network 100 may be configured to adjust the shape of the anatomical structure indicated by representation 104 and generate refined representation 106 of the anatomical structure based on prior knowledge obtained from a statistical shape model. Representation 106 may be generated in the same format as representation 104 (e.g., a point cloud) and may correspond to a deformed (e.g., warped) and transformed (e.g., via an affine transform) version of representation 104. The process and/or techniques for generating representation 106 and the training of neural network 100 for performing these tasks will be described in greater detail below.

In addition to generating representation 106 to indicate the refined shape of the anatomical structure, the neural network 100 may also be configured to segment the anatomical structure in the medical scan image 102 based on the refined shape of the anatomical structure indicated by representation 106. For example, the neural network 100 may be configured to generate segmentation mask 108 that may identify pixels in the medical scan image 102 corresponding to the anatomical structure (e.g., the left ventricle epicardium, the left ventricle endocardium, the right ventricle epicardium, the right ventricle endocardium, etc.). As will be described in greater detail below, segmentation mask 108 may provide not only a delineation of the anatomical structure in the medical scan image 102, but also an additional reference that may be used to refine the deformation and/or affine parameters (e.g., point clouds) predicted by the neural network.

Figure 2:
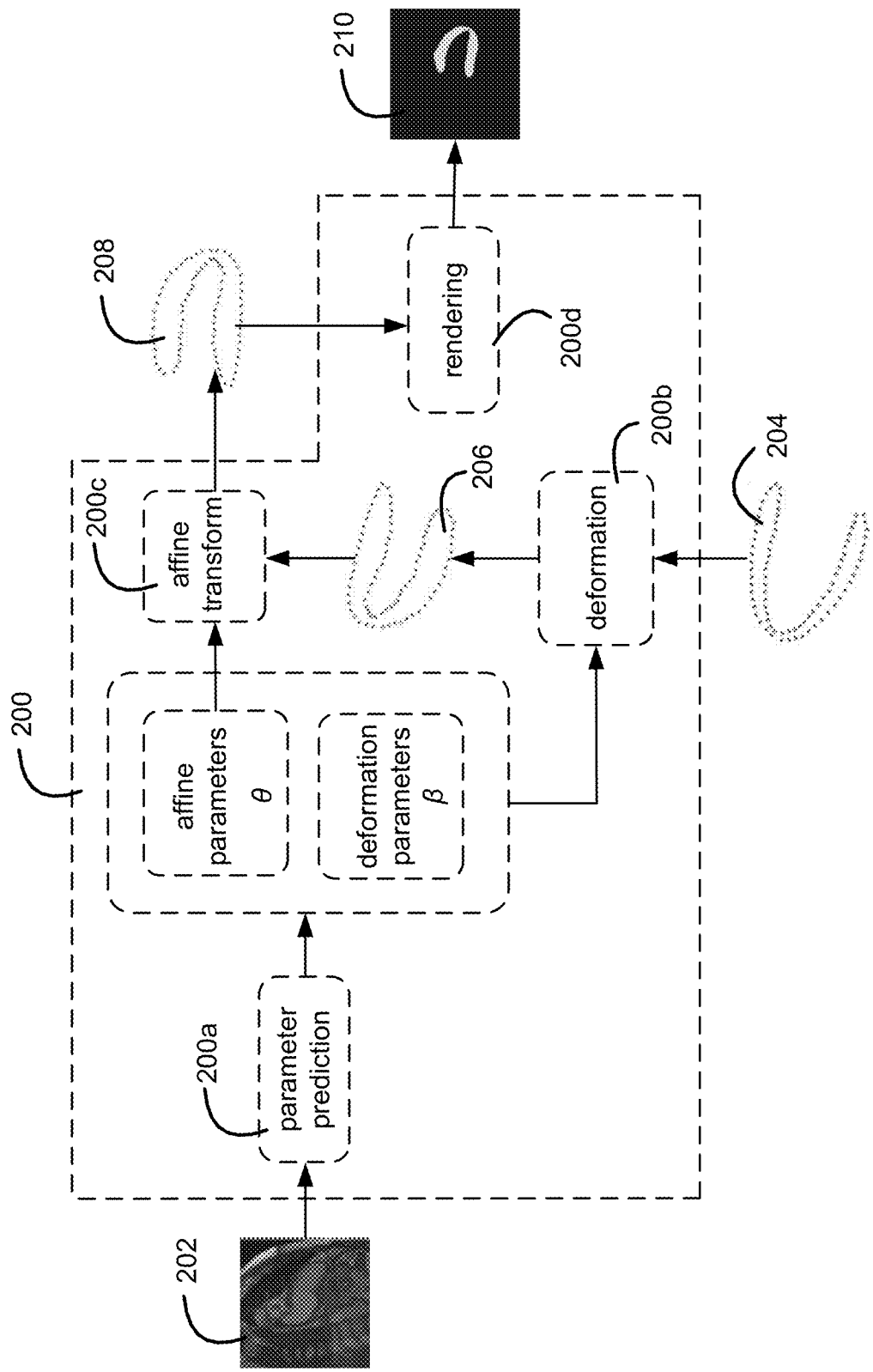
FIG. 2 is a simplified diagram illustrating an example of a neural network for determining the shape of an anatomical structure and/or a segmentation of the anatomical structure in accordance with one or more embodiments describe herein.

FIG. 2 is a simplified diagram illustrating an example of a neural network 200 (e.g., neural network 100 shown in FIG. 1) for determining the shape of an anatomical structure and/or a segmentation of the anatomical structure. As shown, the neural network 200 may be configured to accomplish these tasks based on a medical scan image 202 (e.g., the medical scan image 102 of FIG. 1) of the anatomical structure and a representation 204 (e.g., the representation 104 of FIG. 1) of the anatomical structure. Medical scan image 202 may include an MRI image, an MRI movie, a CT image, an ultrasound image, etc. while representation 204 may include a point cloud (e.g., a 2D or 3D point cloud) representing a mean shape of the anatomical structure among a population.

Neural network 200 may include a plurality of layers such as one or more convolutional layers, one or more pooling layers, and/or one or more fully connected layers. Each of the convolutional layers may include a plurality of convolution kernels or filters having respective weights that are configured to extract specific features from the medical scan image 202. The convolution operations may be followed by batch normalization and/or linear or non-linear activation, and the features extracted by the convolutional layers (e.g., in the form of a feature map or feature vector) may be down-sampled through the pooling layer(s) and/or the fully connected layer(s) (e.g., using a 2×2 window and a stride of 2) to reduce the redundancy and/or dimension of the features (e.g., by a factor of 2). The extracted features may be used by the fully-connected layer(s) to regress a desired value.

In examples, a subset of the plurality of layers described above (e.g., a plurality of convolutional layers followed by one or more fully connected layers) may form a parameter prediction module 200a (e.g., a parameter determination sub-network) configured to predict (e.g., regress) a first plurality of parameters $\beta$ and a second plurality of parameters $\theta$ for refining the mean shape of the anatomical structure indicated by representation 204 to match the shape of the anatomical structure in medical scan image 202. The first plurality of parameters $\beta$ may be used to adjust the shape of the anatomical structure indicated by the representation 204 (e.g., to deform or warp the representation 204 into a warped representation 206). As such, the first plurality of parameters may be referred herein as deformation parameters. The second plurality of parameters $\theta$ may be used to transform (e.g., via an affine transform) the warped representation 206 into a refined (e.g., warped and transformed) representation 208 (e.g., another 2D or 3D point cloud) and, as such, the second plurality of parameters may be referred to herein as affine transformation parameters or affine parameters. In examples, the deformation parameters β may correspond to weights associated with the principal components of a statistical shape model, which will be described in greater detail below. The affine parameters θ may include one or more transformation vectors or matrices that may be used to modify the geometric structure of the warped representation 206 (e.g., through translation, rotation, scaling, etc.) to obtain representation 208.

The neural network 200 may include a shape adjustment module 200b (e.g., one or more shape adjustment layers) and an affine transform module 200c (e.g., one or more affine transform layers) configured to perform the deformation (e.g., warping) and transformation operations described herein, respectively, as illustrated by Equation (1) blow:

$$P=\theta(P_m+\beta*C) \quad (1)$$

where θ may represent the affine parameters predicted by neural network 200 for transforming the shape of the anatomical structure in an image space, C may represent a principal component matrix (e.g., comprising eigen vectors computed from a shape space), β may represent the deformation parameters predicted by the neural network 200 for warping the mean shape of the anatomical structure, $P_m$ may represent a mean point cloud (e.g., representation 204) of the anatomical structure that may be pre-determined, and P may represent a target point cloud (e.g., representation 208) that may be generated by neural network 200. The derivation of $P_m$, C, and the statistical shape model will be described in greater detail below in association with the training of the neural network 200.

The deformation and transformation operations may be performed using various techniques. For example, the deformation module 200b may be configured to deform (e.g., warp) the representation 202 by mapping, based on the deformation parameters β, one or more pixels or voxels (e.g., each pixel or voxel) of the representation 204 to corresponding pixels or voxels in the warped representation 206. The affine transform module 200c may be configured to manipulate the geometric structure of the warped representation 206 by applying one or more of a translation, rotation, or scaling to the warped representation 206 based on the affine parameters θ.

The neural network 200 may be further configured to segment the anatomical structure from the medical scan image 202, for example, by generating a segmentation mask 210 (e.g., a 2D segmentation mask) for the anatomical structure based on the representation 208 predicted by the network. To that end, the neural network 200 may further include an image rendering module 200d (e.g., one or more rendering layers) configured to perform the segmentation task. In examples, the rendering module 200d may be configured to generate the segmentation mask 210 in a differentiable manner such that, when training the neural network 200, an extra loss (e.g., in addition to a parameter prediction loss) may be determined based on the segmentation operation and backpropagated through the neural network to improve the prediction accuracy for deformation parameters β and affine parameters θ.

Various techniques may be employed to render the segmentation mask 210 in a differentiable manner. For example, one or more of the following operations may be performed during the rendering process to make it differentiable. The point cloud included in the representation 208 may be converted into a polygon, e.g., through triangulation. For instance, assuming the point cloud includes T points denoting the shape of the anatomical structure (e.g., a myocardium), half of the T points (e.g., 0, 1, 2, . . . (T/2−1)) may be used to cover the inside boundary of the anatomical structure and the remaining half of the T points (e.g., T/2, (T/2+1), (T/2+2), . . . T−1) may be used to cover the outside boundary of the anatomical structure. Using these points, the faces of the anatomical structures may be formulated (e.g., as triangles) with the following indices/vertices, {0, 1, (T/2)}, {1, 2, (T/2+1)}, . . . , {(T/2−2), (T/2−1), (T/2−2)}, {T/2, (T/2+1), 1}, {(T/2+1), (T/2+2), 2)}, . . . , {(T−2), (T−1), (T/2−1)}, resulting in a total of (T−2) triangulated faces. The segmentation mask 210 may then be rendered based on the vertices and triangulated faces through a rasterization process, where pixels inside the triangulated faces may be treated as having a value of one and those outside the triangulated faces may be treated as having a value of zero. The rasterization (e.g., sampling) may be performed in a gradual and thus differential manner (e.g., rather than as discrete operations based on thresholds), for example, by approximating sudden changes in the sampling values using interpolation (e.g., linear interpolation). As will be described in greater detail below, by including the differential rendering module or layer 200d in the neural network 200, the system may not only produce a mask for segmenting the anatomical structure, but also utilize the information (e.g., losses) gained during the segmentation process to further improve the performance of the parameter prediction module 200a, the deformation module 200b, and/or the affine transform module 200c.

Figure 3:
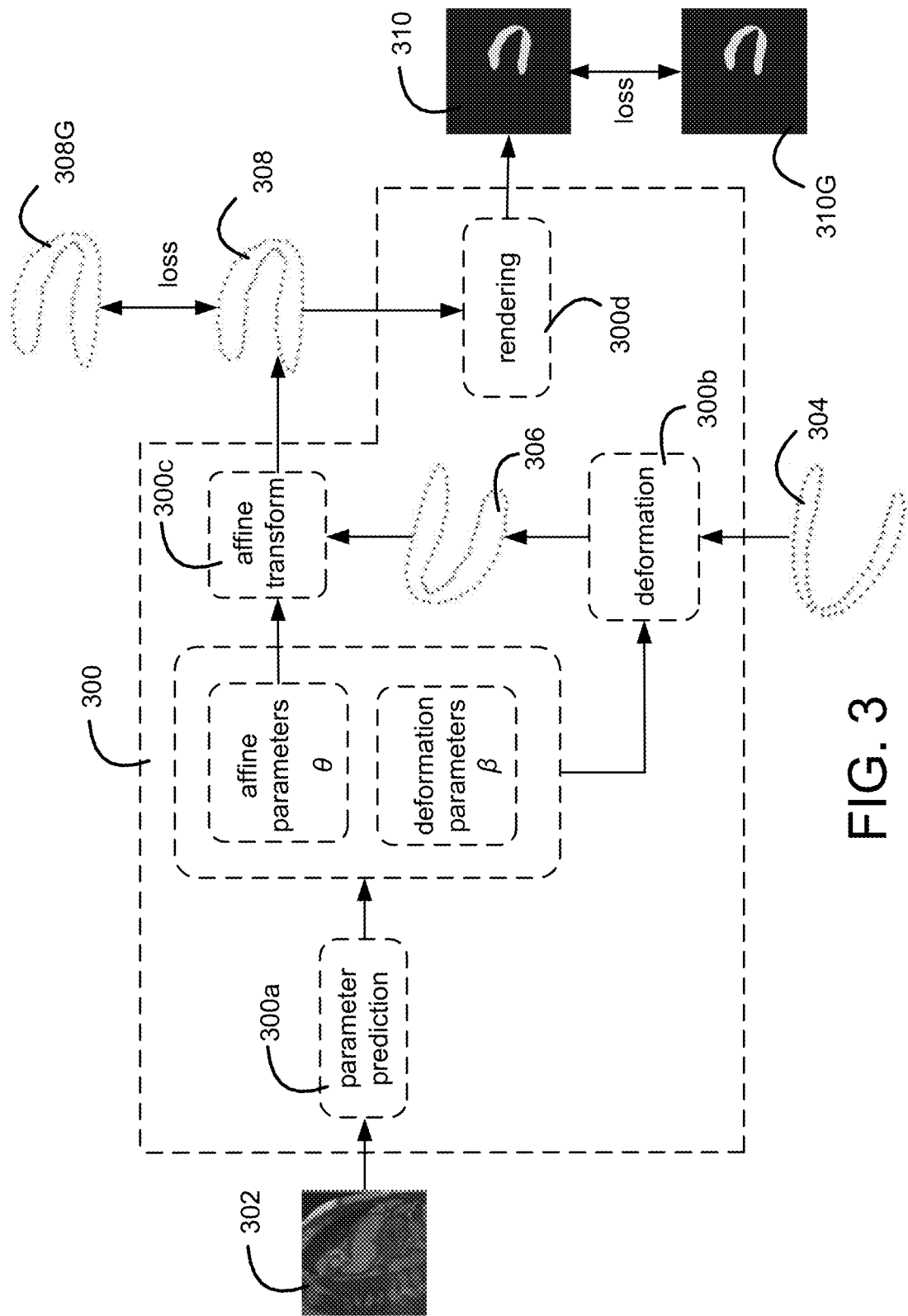
FIG. 3 is a simplified diagram illustrating the training of a neural network for performing the shape refinement and/or segmentation tasks in accordance with one or more embodiments describe herein.

FIG. 3 is a simplified diagram illustrating the training of a neural network 300 (e.g., an instance of the neural network 100 of FIG. 1 or 200 of FIG. 2) for performing the shape refinement and/or segmentation tasks described herein. The training may be performed in an end-to-end manner using a training dataset comprising a plurality of medical scan images 302 (e.g., 2D or 3D images) of the anatomical structure described herein, a representation 304 of the anatomical structure (e.g., a point cloud) indicating a mean shape of the anatomical structure, ground truth deformation parameters β', ground truth affine parameters θ', ground truth representations 308G (e.g., point clouds) of the anatomical structure corresponding to the scan images 302, and ground truth segmentation masks 310G of the anatomical structure corresponding to the scan images 302.

In examples, the dataset used to train neural network 300 may be prepared by performing one or more of the following. Medical scan images 302 of the anatomical structure and ground truth segmentation masks 310 corresponding to the scan images may be obtained, for example, from a public cine MRI dataset. Based on scan images 302 and segmentation masks 310, ground truth representations 308G (e.g., point clouds) of the anatomical structure may be derived, for example, through the following operations. Segmentation masks 310 may be registered with each other (e.g., transformed into a canonical template domain) via an affine transformation to remove the impact of translation, rotation, and/or scaling from shape determination (e.g., because the segmentations may be different from each other with respect to scaling and/or position). During the registration, an arbitrary segmentation mask may be selected as a reference while all other segmentation masks may be registered to the reference. The registered segmentation masks may then be averaged and the average may be used as a new reference to which all of the segmentation masks may be registered. This process may be repeated a number of times (e.g., in manners resembling a generalized Procrustes analysis (GPA)) to converge the registration of the segmentation masks, after which a point cloud P may be determined based on an average of the registered segmentations. Based on the point cloud P, a point cloud $P_i$ (e.g., i=1 ... N) may be derived in the image domain for each image i, for example, through inverse deformation and/or transformation. From these point clouds (e.g., $P_1, P_2 ... P_N$), a statistical shape model may be established, for example, by determining a mean point cloud $P_m$ (e.g., mean point cloud $P_m$ in Equation (1) and/or representation 204 of FIG. 2) as an average of the point clouds ($P_1, P_2 ... P_N$) and determining a principal component matrix $C_\beta$ (e.g., principal component matrix C in Equation (1)) by applying PCA on the point clouds ($P_1, P_2 ... P_N$) to extract the principal modes of variations to the mean shape (e.g., mean point cloud $P_m$).

Once the data preparation is complete, the training of the neural network 300 may begin, for example, by receiving the training scan image 302 as an input and predicting, through parameter prediction module 300a of the neural network, a first plurality of parameters β (e.g., weights associated with the principal component matrix $C_\beta$) and a second plurality of parameters θ (e.g., one or more affine transformation vectors or matrices). Using the first plurality of parameters β, neural network 300 (e.g., a deformation module 300b of the neural network) may deform the representation 304, e.g., according to Equation (1), to obtain a warped representation 306 (e.g., a 2D or 3D point cloud). Using the second plurality of parameters θ, neural network 300 (e.g., an affine transform module 300c of the neural network) may further transform the warped representation 306 (e.g., according to Equation (1)) to obtain a refined representation 308 (e.g., another 2D or 3D point cloud). The neural network 300 may then compare the refined representation 308 with the ground truth representation 308G that corresponds to the training scan image 302, and determine a loss between the two representations. Such a loss may be calculated in different manners, for example, as the mean squared errors (MSE) between the refined representation 308 and the ground truth representation 308G. One or more other losses may also be determined to facilitate the training of neural network 300 including, for example, a loss (e.g., MSE loss) between the predicted deformation parameters β and ground truth deformation parameters β' and/or a loss (e.g., MSE loss) between affine parameters θ and ground truth affine parameters θ'. Once these losses have been determined, they may be backpropagated individually or as a combined loss (e.g., as an average of the multiple losses) through the neural network 300 so as to adjust the operating parameters (e.g., weights associated with one or more of the parameter prediction module 300a, the deformation module 300b, or the affine transform module 300c) of the neural network.

In examples, the neural network 300 may also be configured to perform a segmentation task in conjunction with the parameter prediction task described herein during the training process. For example, the neural network 300 may predict a segmentation mask 310 for the anatomical structure based on the refined representation 308. As described herein, such a segmentation mask may be rendered in a differentiable manner using a rendering module or rendering layer 300d of the neural network 300. Once generated, the segmentation mask 310 may be compared to the ground truth segmentation 310G that corresponds to the training scan image 302, and an additional loss may be determined between the two masks. Such a loss may be calculated, for example, as a dice loss between the predicted mask 310 and the ground truth mask 310G. And since the rendering of the segmentation mask 310 is performed in a differentiable manner, the loss associated with the mask may be backpropagated (e.g., based on a gradient descent of the loss) through the neural network 300 to further improve the operating parameters of the network.

The training techniques illustrated by FIG. 3 and described above may address issues associated with having a large search space for the deformation parameters β and transformation parameters θ (e.g., converge the parameter prediction network within such a large search space may be difficult). At the same time, misalignment between a predicted point cloud and a ground truth point cloud may cause defective segmentation masks to be generated based on the misaligned point cloud. By considering losses associated with both parameter prediction and segmentation during the training process, the outcome of both operations may be improved.

In examples, the neural network described herein (e.g., the neural network 100 of FIGS. 1 and/or 200 of FIG. 2) may be configured to further merge the parameter prediction and segmentation operations, for example, by having one branch of the neural network output a segmentation of the anatomical structure, having another branch of the network output the deformation and transformation parameters described herein, and allowing the two branches to share certain structures and/or intermediate results (e.g., features extracted from an input scan image) to improve the performance of both branches.

Figure 4:
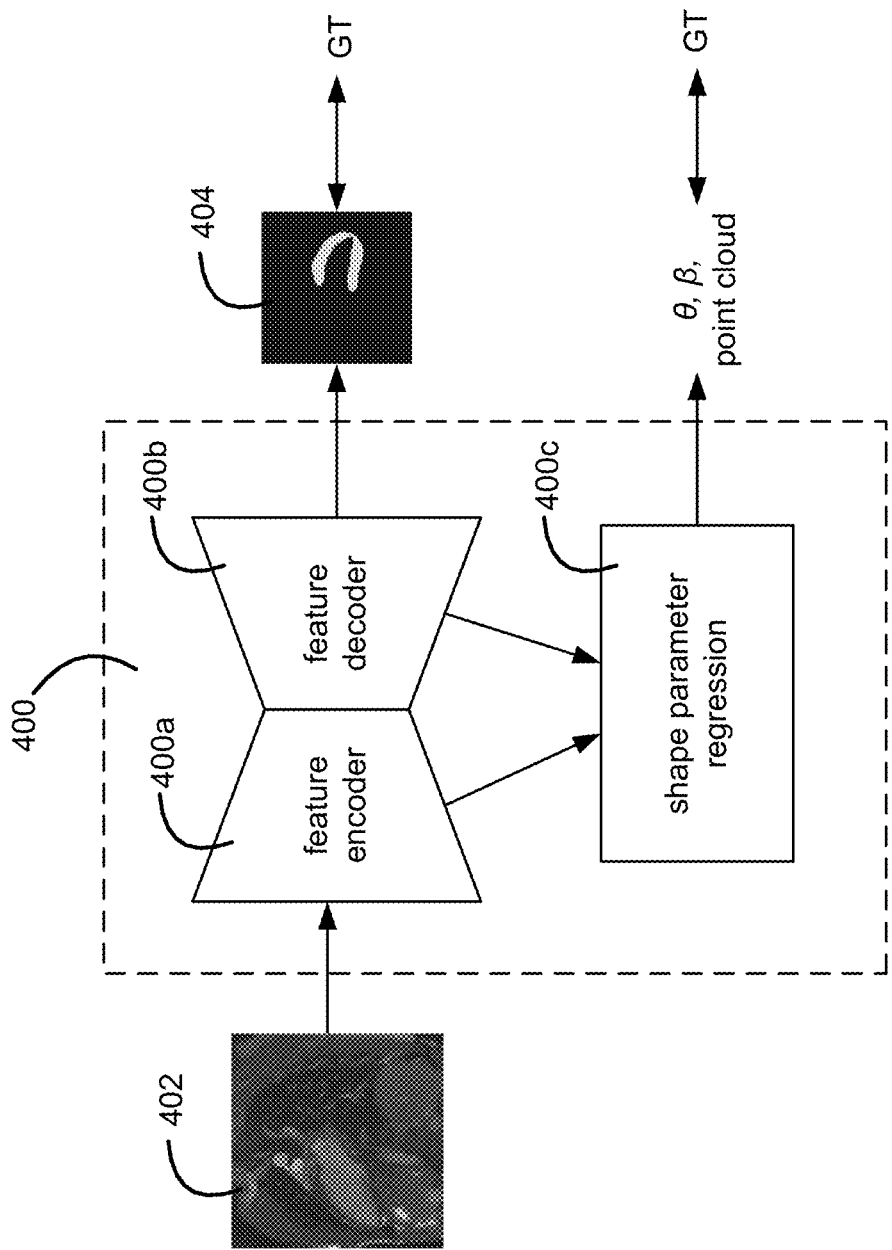
FIG. 4 is a simplified diagram illustrating an example neural network that may include a feature encoder and a feature decoder in accordance with one or more embodiments described herein.

FIG. 4 shows an example of such a neural network 400. The neural network 400 may include a feature encoder 400a and a feature decoder 400b configured to segment an anatomical structure from an input scan image 402. The encoder 400a may include a convolutional neural network (CNN), which in turn may include a plurality of layers such as one or more convolutional layers, one or more pooling layers, and/or one or more fully connected layers. Each of the convolutional layers may include a plurality of convolution kernels or filters configured to extract specific features from the input scan image 402. The convolution operations may be followed by batch normalization and/or line or non-linear activation, and the features extracted by the convolutional layers (e.g., in the form of a feature map or feature vector) may be down-sampled through the pooling layers and/or the fully connected layers to reduce the redundancy and/or dimension of the features. The decoder 400b may include one or more un-pooling layers and one or more transposed convolutional layers. Through the un-pooling layers, the decoder 400b may up-sample the features extracted by the encoder 400a and may further process the up-sampled features through one or more transposed convolution operations (e.g., via the one or more transposed convolutional layers) to derive a dense feature map.

Utilizing both low-level structural and high-level semantic information extracted by the encoder 400a and the decoder 400b, the neural network 400 may predict a segmentation mask 404 through a branch of the network that comprises the encoder 400a and the decoder 400b. The encoder/decoder branch may also serve as a backbone for a parameter regression branch 400c configured to predict the deformation parameters β and transformation parameters θ described herein, and/or a point cloud representing the shape of the anatomical structure as described herein. For example, image features extracted from one or more (e.g., all) encoder layers (or decoder layers) may be concatenated (e.g., to avoid a bypass) and the features may be forwarded to a bottleneck layer to extract information for the regression task. By utilizing these segmentation features directly, information learned through the segmentation task may be used to improve the quality of shape parameter prediction and/or point cloud estimation. Further, the neural network 400 may be trained based on a combination of losses (e.g., between prediction results and corresponding ground truth (GT)) including, e.g., a parameter regression loss, a point cloud estimation loss, and/or a segmentation loss. This training technique may also improve the performance of the network compared to training the neural network based only on a single loss (e.g., such as only the parameter regression loss).

Figure 5:
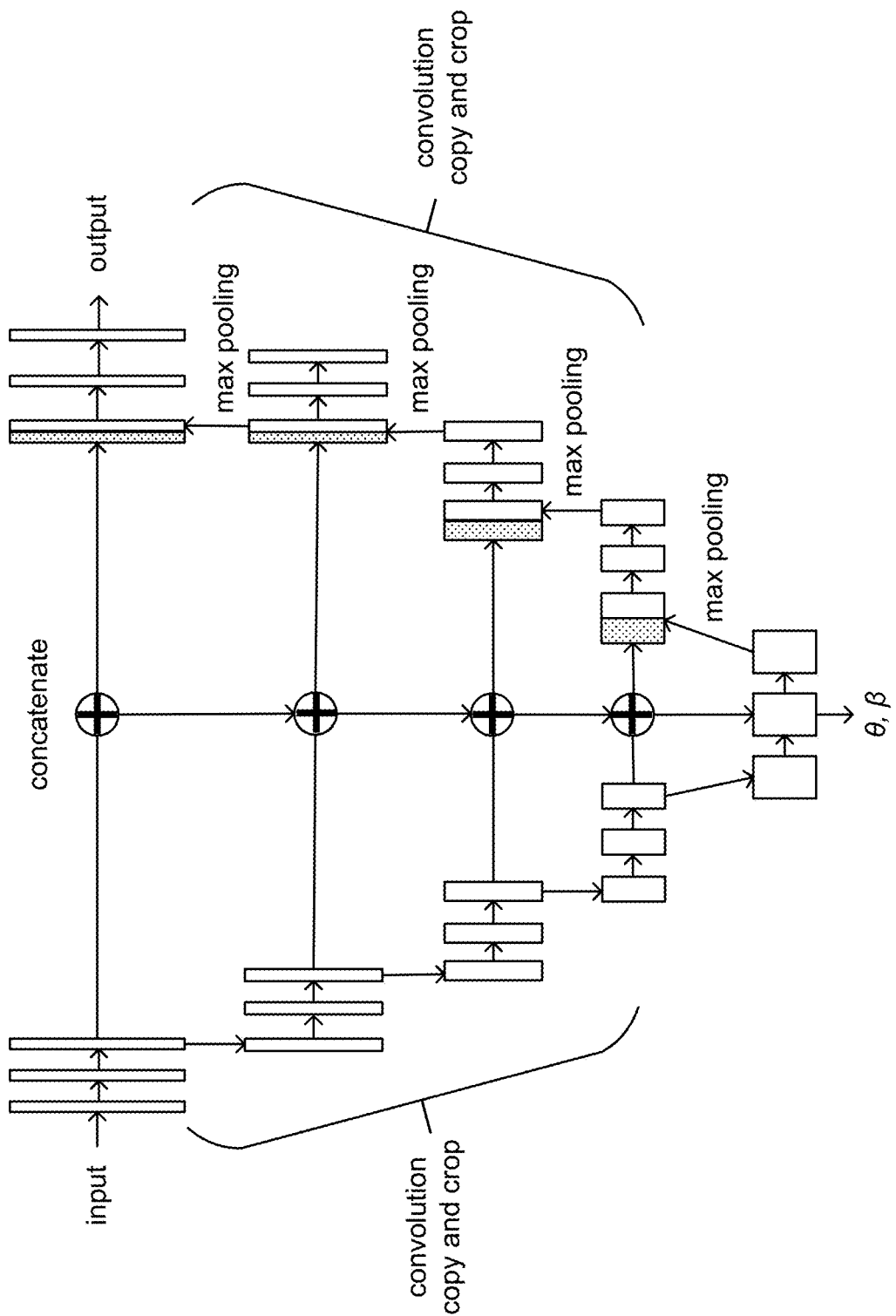
FIG. 5 is a simplified diagram illustrating an example neural network structure in accordance with one or more embodiments described herein.

FIG. 5 illustrates an example structure that may be included as a part of the neural network 400. As shown, a feature encoder (e.g., left side of the figure) and a feature decoder (e.g., right side of the figure) may form a backbone of the neural network to extract features from an input scan image and estimate a segmentation mask at an output based on the extracted features. The extracted features may also be concatenated and forwarded to a bottleneck (e.g., a bottleneck layer) of the neural network, where they may be used by multiple (e.g., three) fully connected layers (e.g., attached to the bottleneck) to regress the deformation parameters $\beta$ and the transformation parameters $\theta$ described herein. The neural network may be trained based on multiple losses including, for example, a loss associated with the point cloud generation and a loss associated with the image segmentation.

Figure 6:
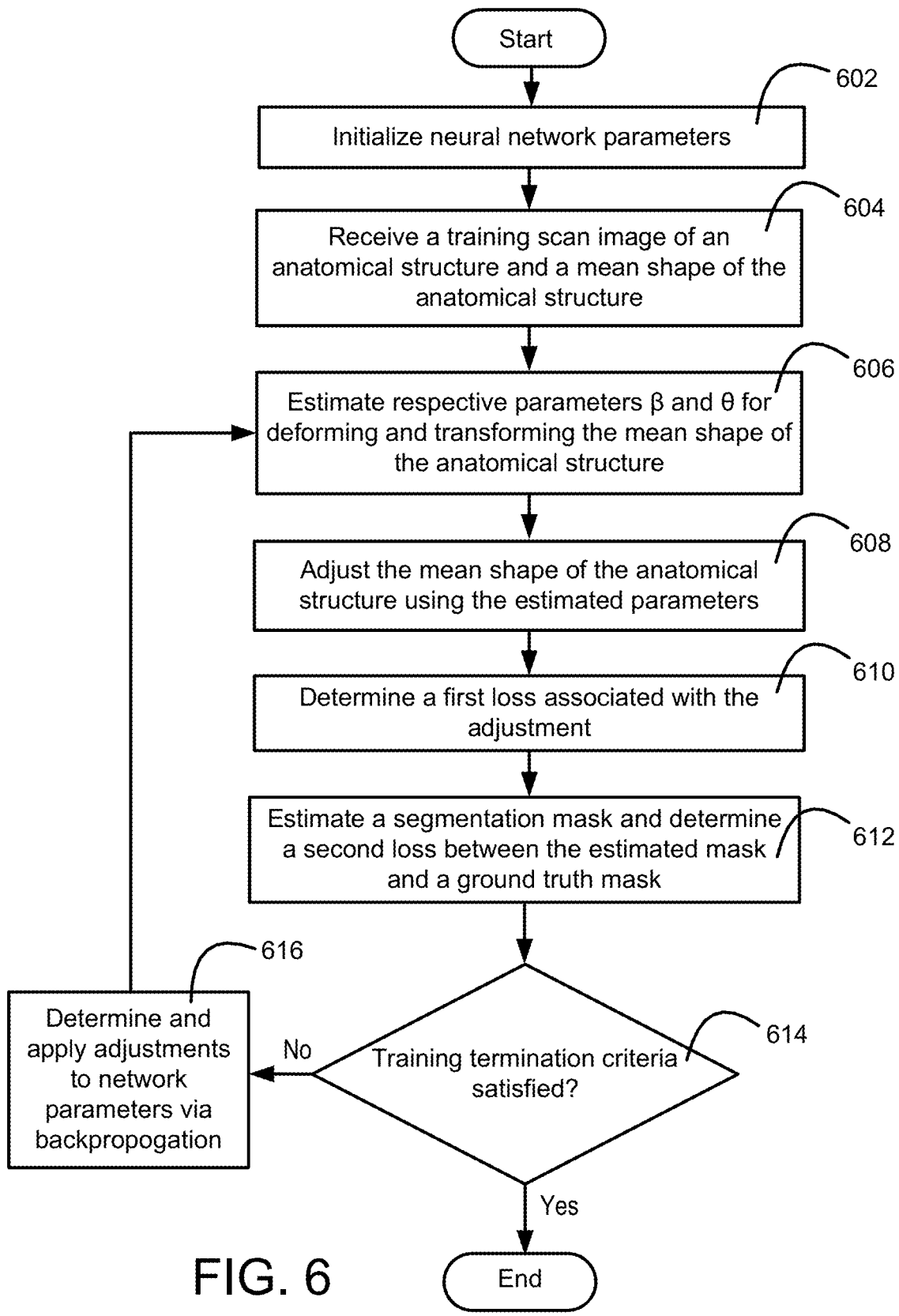
FIG. 6 is a simplified diagram illustrating example operations that may be performed while training a neural network described in one or more embodiments provided herein.

FIG. 6 illustrates example operations that may be performed while training a neural network (e.g., the neural network 100 of FIG. 1, 200 of FIG. 2, 300 of FIG. 3, 400 of FIG. 4, etc.) in accordance with one or more embodiments described herein. For example, at 602, parameters of the neural network (e.g., weights associated with various filters or kernels of the neural network) may be initialized. The parameters may be initialized, for example, based on samples collected from one or more probability distributions or parameter values of another neural network having a similar architecture. At 604, the neural network may receive a training scan image of an anatomical structure (e.g., an MRI image of the myocardium) and a training representation (e.g., a 3D point cloud) of the anatomical structure that indicates a mean shape of the anatomical structure derive from a population. At 606, the neural network may extract features from the training scan image and predict the respective values of a first plurality of parameters $\beta$ (e.g., deformation parameters) and a second plurality of parameters $\theta$ (e.g., affine transformation parameters) based on the extract features. At 608, the neural network may deform (e.g., warp) the received training representation of the anatomical structure using the first plurality of parameters $\beta$ to obtain a warped representation of the anatomical structure, and further transform the warped representation to obtain a transformed representation of the anatomical structure. At 610, the neural network may compare the representation obtained at 608 (e.g., which may indicate an adjusted shape of the anatomical structure) with a ground truth representation of the anatomical structure (e.g., which may indicate a ground truth shape of the anatomical structure) and determine a first loss based on the comparison. The first loss may be determined, for example, based on a mean squared error associated with the predicted representation.

At 612, the neural network may render, based on the representation of the anatomical structure obtained at 608, a segmentation mask associated with the anatomical structure in a differential manner. The neural network may then compare the rendered segmentation mask with a ground truth segmentation mask and determine a second loss based on the comparison. The second loss may be determined, for example, as a dice loss between the mask rendered by the neural network and the ground truth mask. At 614, the neural network may determine whether one or more training termination criteria have been satisfied. For example, a training termination criterion may be deemed satisfied if the first and second losses described above are below respective predetermined thresholds, if a change in the loss value between two training iterations (e.g., between consecutive training iterations) falls below a predetermined threshold, etc. If the determination at 614 is that a training termination criterion has been satisfied, the training may end. Otherwise, the neural network may at 616 adjust its parameters by backpropagating the first and second losses through the neural network (e.g., based on respective gradient descents associated with the first and second losses or a gradient descent associated with a combined loss such as an average of the first and second losses), before the training returns to 606.

It should be noted that although FIG. 6 only shows a first loss associated with shape estimation (e.g., point cloud estimation) and a second loss associated with segmentation, other types of losses may also be determined and/or utilized to facilitate the training of the neural network. These losses may include, for example, a loss between estimated deformation parameters $\beta$ and ground truth deformation parameters $\beta'$ and/or a loss between estimated affine transform parameters $\theta$ and ground truth deformation parameters $\theta'$.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

The parameters, representations (e.g., point clouds), and/or segmentations obtained using the neural network described herein may be used to serve multiple clinical purposes. For example, as described herein, the neural network may be capable of processing not only single scan images (e.g., static image frames) but also series of scan images (e.g., dynamic images) such as those included in a cine movie (e.g., a cardiac cine movie). When given a series of scan images of an anatomical structure at the input, the neural network may process the images on an individual basis and generate a point cloud and/or a segmentation mask based on each of the images. Such point clouds and/or segmentation masks may indicate changes in the shape of the anatomical structure over a time period and, as such, may be used to track the motion of the anatomical structure during the time period.

Figure 7:
FIG. 7 is a simplified diagram illustrating an example application scenario for the techniques described in one or more embodiments provided herein.

FIG. 7 shows an example application scenario for the techniques described herein. As shown, the neural network described herein may be used to generate point clouds (e.g., the representations 208 and 308 shown in FIGS. 2 and 3, respectively) that may indicate the shape of the myocardium during a complete cycle of cardiac contraction and relaxation. These point clouds may be used to track the motion of the myocardium starting from relaxation to contraction and back to relaxation.

Figure 8:
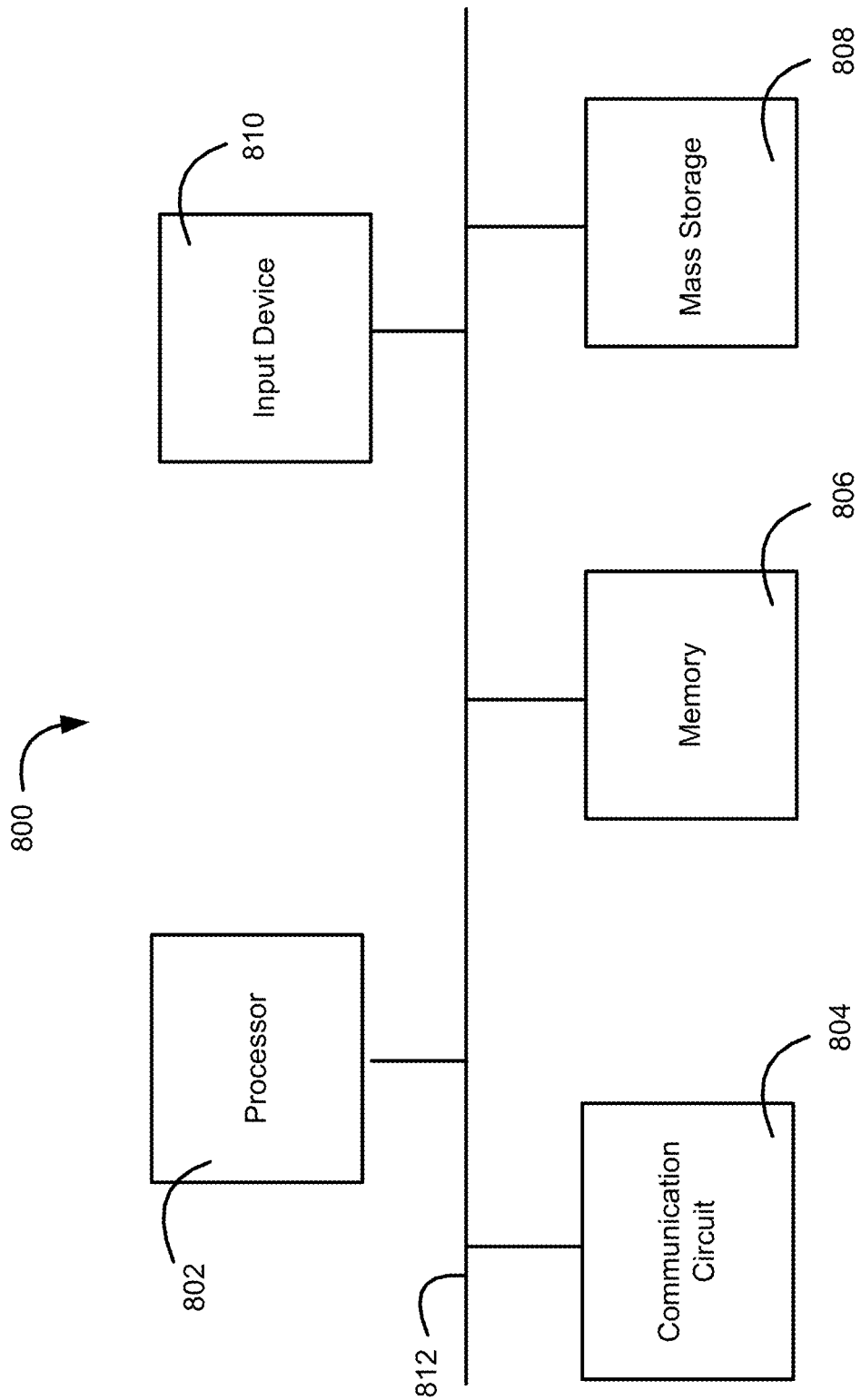
FIG. 8 is a simplified diagram illustrating example components of an apparatus that may be configured to perform the tasks described in one or more embodiments provided herein.

The systems, methods, and/or instrumentalities described herein may be implemented using one or more processors, one or more storage devices, and/or other suitable accessory devices such as display devices, communication devices, input/output devices, etc. FIG. 8 is a block diagram illustrating an example apparatus 800 that may be configured to perform the shape refinement and segmentation tasks described herein. As shown, the apparatus 800 may include a processor (e.g., one or more processors) 802, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. The apparatus 800 may further include a communication circuit 804, a memory 806, a mass storage device 808, an input device 810, and/or a communication link 812 (e.g., a communication bus) over which the one or more components shown in the figure may exchange information.

The communication circuit 804 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). The memory 806 may include a storage medium (e.g., a non-transitory storage medium) configured to store machine-readable instructions that, when executed, cause the processor 802 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. The mass storage device 808 may include one or more magnetic disks such as one or more internal hard disks, one or more removable disks, one or more magneto-optical disks, one or more CD-ROM or DVD-ROM disks, etc., on which instructions and/or data may be stored to facilitate the operation of the processor 802. The input device 810 may include a keyboard, a mouse, a voice-controlled input device, a touch sensitive input device (e.g., a touch screen), and/or the like for receiving user inputs to the apparatus 800.

It should be noted that the apparatus 800 may operate as a standalone device or may be connected (e.g., networked or clustered) with other computation devices to perform the functions described herein. And even though only one instance of each component is shown in FIG. 8, a skilled person in the art will understand that the apparatus 800 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
one or more processors configured to:
obtain an original three-dimensional (3D) representation of an anatomical structure, wherein the original 3D representation indicates a mean shape of the anatomical structure determined based on a statistical shape model of the anatomical structure;
obtain a two-dimensional (2D) medical scan image of the anatomical structure;
determine, based on the obtained 2D medical scan image and a pre-trained artificial neural network (ANN), a set of deformation parameters and a set of transformation parameters;
deform the original 3D representation of the anatomical structure using the set of deformation parameters to obtain a deformed 3D representation of the anatomical structure;
transform the deformed 3D representation of the anatomical structure using the set of transformation parameters to obtain a refined 3D representation of the anatomical structure; and
generate, using the pre-trained ANN, a segmentation of the anatomical structure based on the refined 3D representation of the anatomical structure, wherein the pre-trained ANN comprises one or more rendering layers configured to generate the segmentation in a differentiable manner, and wherein the pre-trained ANN further comprises a parameter prediction sub-network configured to predict the set of deformation parameters and the set of transformation parameters.

2. The apparatus of claim 1, wherein the original 3D representation of the anatomical structure obtained by the one or more processors comprises a point cloud.

3. The apparatus of claim 1, wherein the segmentation of the anatomical structure comprises a segmentation mask of the anatomical structure.

4. The apparatus of claim 1, wherein the differentiable manner allows a gradient descent of a loss to be calculated and backpropagated during the training of the ANN.

5. The apparatus of claim 4, wherein the loss is associated with the estimation of a segmentation mask during the training of the ANN.

6. The apparatus of claim 1, wherein the one or more rendering layers of the pre-trained ANN being configured to generate the segmentation of the anatomical structure in the differentiable manner comprises the one or more rendering layers being configured to derive one or more samples of the segmentation via linear interpolation.

7. The apparatus of claim 1, wherein the ANN is trained through a process that comprises:
obtaining a training image of the anatomical structure;
obtaining a 3D training representation of the anatomical structure that indicates the mean shape of the anatomical structure;
estimating values of the set of deformation parameters and the set of transformation parameters;
adjusting the 3D training representation of the anatomical structure using the estimated values of the set of deformation parameters and the set of transformation parameters;
predicting a segmentation of the anatomical structure based on the adjusted 3D training representation of the anatomical structure; and adjusting parameters of the ANN based on a difference between the predicted segmentation of the anatomical structure and a ground truth segmentation of the anatomical structure.

8. The apparatus of claim 7, wherein the parameters of the ANN are adjusted further based on a difference between the adjusted 3D training representation and a ground truth 3D representation of the anatomical structure.

9. The apparatus of claim 1, wherein the one or more processors are further configured to track a motion of the anatomical structure using the set of deformation parameters and the set of transformation parameters.

10. A method for processing medical images, the method comprising:
    obtaining an original three-dimensional (3D) representation of an anatomical structure, wherein the original 3D representation indicates a mean shape of the anatomical structure determined based on a statistical shape model of the anatomical structure;
    obtaining a two-dimensional (2D) medical scan image of the anatomical structure;
    determining, based on the obtained 2D medical scan image and a pre-trained artificial neural network (ANN), a set of deformation parameters and a set of transformation parameters;
    deforming the original 3D representation of the anatomical structure using the set of deformation parameters to obtain a deformed 3D representation of the anatomical structure;
    transforming the deformed 3D representation of the anatomical structure using the set of transformation parameters to obtain a refined 3D representation of the anatomical structure; and
    generating, using the pre-trained ANN, a segmentation of the anatomical structure based on the refined 3D representation of the anatomical structure, wherein the pre-trained ANN comprises one or more rendering layers configured to generate the segmentation in a differentiable manner, and wherein the pre-trained ANN further comprises a parameter prediction sub-network configured to predict the set of deformation parameters and the set of transformation parameters.

11. The method of claim 10, wherein the original 3D representation of the anatomical structure comprises a point cloud.

12. The method of claim 10, wherein the segmentation of the anatomical structure comprises a segmentation mask of the anatomical structure.

13. The method of claim 10, wherein the differentiable manner allows a gradient descent of a loss to be calculated and backpropagated during the training of the ANN.

14. The method of claim 13, wherein the loss is associated with the estimation of a segmentation mask during the training of the ANN.

15. The method of claim 10, wherein the one or more rendering layers of the pre-trained ANN being configured to generate the segmentation of the anatomical structure in the differentiable manner comprises the one or more rendering layers being configured to derive one or more samples of the segmentation via linear interpolation.

16. The method of claim 10, wherein the ANN is trained through a process that comprises:
    obtaining a training image of the anatomical structure;
    obtaining a 3D training representation of the anatomical structure that indicates the mean shape of the anatomical structure;
    estimating values of the set of deformation parameters and the set of transformation parameters;
    adjusting the 3D training representation of the anatomical structure using the estimated values of the set of deformation parameters and the set of transformation parameters;
    predicting a segmentation of the anatomical structure based on the adjusted 3D training representation of the anatomical structure; and
    adjusting parameters of the ANN based on a difference between the predicted segmentation of the anatomical structure and a ground truth segmentation of the anatomical structure.

17. The method of claim 16, wherein the parameters of the ANN are adjusted further based on a difference between the adjusted 3D training representation and a ground truth 3D representation of the anatomical structure.

18. The method of claim 10, further comprising tracking a motion of the anatomical structure using the set of deformation parameters and the set of transformation parameters.

* * * * *